United States Patent
Kuo et al.

(10) Patent No.: US 9,243,661 B1
(45) Date of Patent: Jan. 26, 2016

(54) SIX-ROW BALL BEARING LINEAR GUIDEWAY

(71) Applicant: HIWIN TECHNOLOGIES CORP., Taichung (TW)

(72) Inventors: Chang-Hsin Kuo, Taichung (TW); Sheng-Hsiang Huang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 14/528,880

(22) Filed: Oct. 30, 2014

(51) Int. Cl.
*F16C 29/06* (2006.01)
*F16C 29/00* (2006.01)
*F16C 29/04* (2006.01)

(52) U.S. Cl.
CPC ............... *F16C 29/005* (2013.01); *F16C 29/04* (2013.01)

(58) Field of Classification Search
CPC .. F16C 29/06; F16C 29/0623; F16C 29/0633; F16C 29/0645; F16C 29/0647
See application file for complete search history.

(56) References Cited

U.S. PATENT DOCUMENTS

| | | | | |
|---|---|---|---|---|
| 4,664,535 A * | 5/1987 | Mottate | ................. | F16C 29/005 384/45 |
| 5,562,346 A * | 10/1996 | Kuo | ..................... | F16C 29/0647 384/45 |
| 5,716,139 A * | 2/1998 | Okamoto | .............. | F16C 29/063 384/45 |
| 6,123,458 A * | 9/2000 | Tsukada | .................. | F16C 33/58 384/45 |
| 6,132,093 A * | 10/2000 | Michioka | ............ | F16C 29/0607 384/45 |
| 6,231,238 B1 * | 5/2001 | Teramachi | .......... | F16C 29/0638 29/898.03 |
| 2005/0259896 A1 * | 11/2005 | Kuo | ...................... | F16C 33/585 384/45 |
| 2011/0110615 A1 * | 5/2011 | Kishi | .................... | F16C 29/005 384/42 |

FOREIGN PATENT DOCUMENTS

JP H0735136 A 2/1995

* cited by examiner

*Primary Examiner* — Thomas R. Hannon
(74) *Attorney, Agent, or Firm* — Wang Law Firm, Inc.; Li K. Wang; Stephen Hsu (57) ABSTRACT

A six-row ball bearing linear guideway is provided with six rows of balls disposed between the slider and the rail. The six rows of balls are symmetrically disposed at two sides of the rail, the balls in the middle and upper rail rolling grooves bear and increase the load capacity in the downward direction. The balls in the lower rail rolling grooves bear a load in the upward direction, and the profile factor of the lower rail rolling grooves is smaller than that of the upper rail rolling grooves, thus the rated static load capacity in the upward direction is improved. The balls in the upper, middle and lower rail rolling grooves all serve to bear the load capacity in the lateral direction, thus the rated static load capacity in the lateral direction is improved. Hence, the rated static load capacity is improved in upward, downward and lateral directions.

10 Claims, 8 Drawing Sheets

SIX-ROW BALL BEARING LINEAR GUIDEWAY

BACKGROUND OF THE INVENTION

1. Field of the Invention

The present invention relates to a six-row ball bearing linear guideway, and more particularly to a ball bearing linear guideway with improved rated static load capacity in the upward, downward and lateral directions.

2. Description of the Prior Art

Ball bearing linear guideway is an important linear transmission device, and has been widely used on different transportation devices because of its advantages of high efficiency and accuracy. Rated static load capacity is an important consideration when choosing ball bearing linear guideways, including the rated static load capacity in the downward, upward and lateral directions. The rated static load capacity of a ball bearing linear guideway is usually in direct proportion to the number of rows of balls and the diameter of the balls. Therefore, increasing the ball diameter or the number of row of the balls is a measure usually taken to increase the rated static load capacity. However, with the continuously increased machines' requirement for rated static load capacity, the rated static load capacity of the existing ball bearing linear guideway is still insufficient and needs to be improved.

Figure 1:
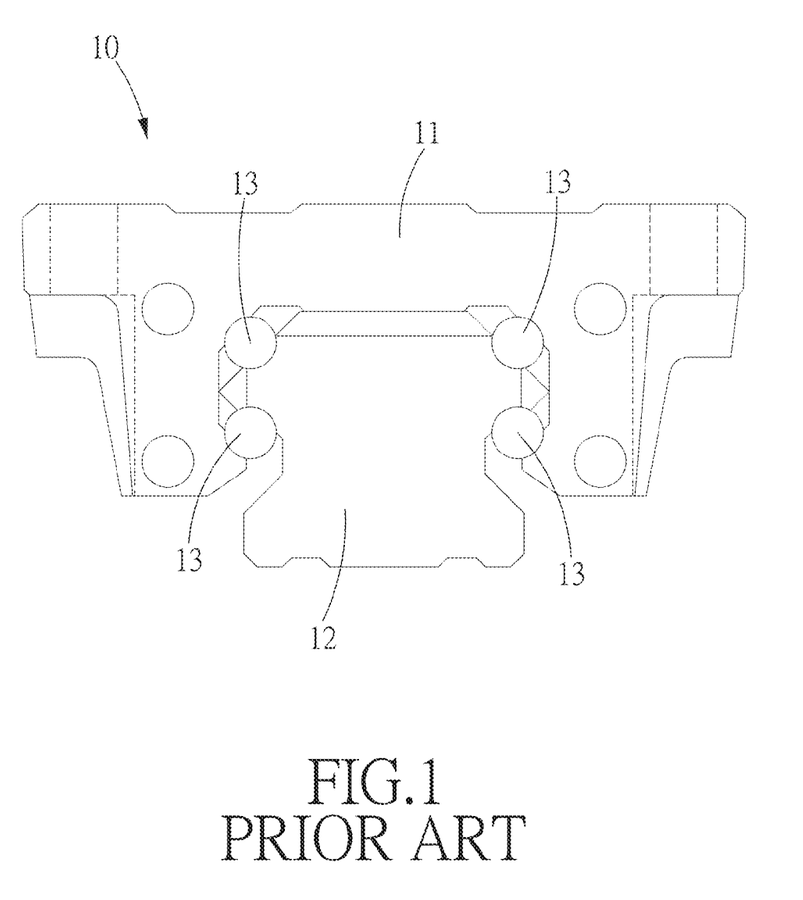
FIG. 1 is an illustrative view of a conventional ball bearing linear guideway.

FIG. 1 shows a ball bearing linear guideway disclosed in Japan Patent No. 07-035136, which comprises a slider 11 slidably mounted on a rail 12, and four rows of balls 13 disposed between the slider 11 and the rail 12 and symmetrically arranged at both sides of the rail 12. The number of the rows of balls of the ball bearing linear guideway 10 is increased from 2 to 4 as compared with other ball bearing linear guideways, so as to increase the rated static load capacity of the ball bearing linear guideway 10. However, by looking at the arrangements of the four rows of balls 13, we can see that the four rows of balls 13 all come into contact with the rolling grooves in an arc-shaped 45°-45°, namely, a contact angle of the respective balls with respect to the rolling grooves is 45 degrees. Such arrangements at this angle can equally provide load capacities in downward, upward and lateral directions. Furthermore, the ball bearing linear guideway 10 is designed with the same profile factor, so that the structure of the ball bearing linear guideway 10 can equally provide load capacities in downward, upward and lateral directions. However, this design is still unable to provide a rated static load capacity which is great enough to satisfy the machines which require higher load capacities in downward, upward and lateral directions.

Figure 2:
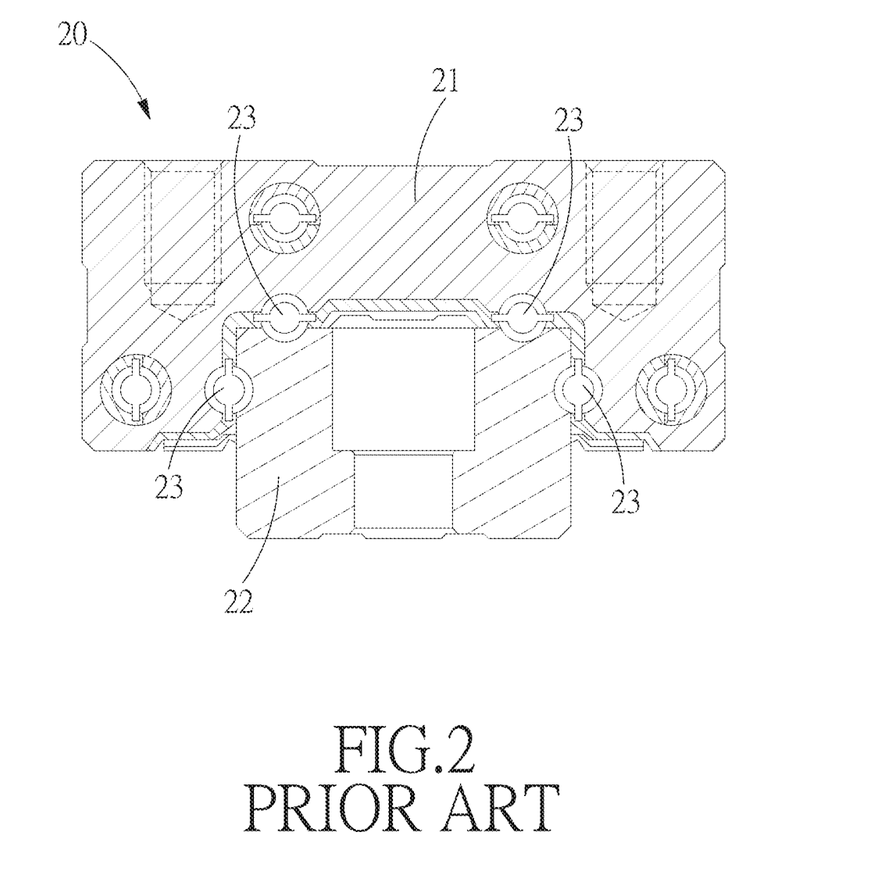
FIG. 2 is a cross sectional view of another conventional ball bearing linear guideway.

FIG. 2 shows a ball bearing linear guideway 20 disclosed in U.S. Pat. No. 6,132,093, which is a conventional technology for increasing the rated static load capacity in the downward and upward directions. The ball bearing linear guideway 10 generally comprises: a slider 21 slidably mounted on a rail 22, and four rows of balls 23 disposed between the slider 21 and the rail 22. Two rows of balls 23 are disposed at the top of the rail 22 to increase the rated static load capacity in the downward direction, and another two rows of balls 23 are disposed at two sides of the rail 22 to increase the rated static load capacity in the upward direction by contact points. However, by looking at the arrangements of the four rows of balls 23, we can see that the two rows of balls 23 at the top of the rail 22 are only capable of bearing the load in the downward direction, but totally unable to bear any load in the upward and lateral directions, while the two rows of balls 23 at two sides of the rail are able to bear the load only in the lateral direction, but totally unable to bear the load in the downward direction. In general, the load capacity cannot be considerably improved in all of the downward, upward and lateral directions. The load capacity might be improved in the downward direction but not in the upward and lateral direction, as a result, the load capacity in general is still not sufficient to enable the ball bearing linear guideway to be applicable to most machines. Furthermore, due to the fact that both the top surface and lateral surfaces of the rail 22 are provided with rolling grooves for reception of the balls 23, the rail 22 must be subjected to a top grinding process and a lateral grinding process, which substantially increases manufacturing cost and reduces manufacturing efficiency. Besides, the two grinding processes have different grinding datum, which may result in position error between the rolling grooves of the top surface and the lateral surfaces, and reduces the accuracy of the ball bearing guideway.

However, increasing the size of the ball bearing linear guideway may increase the load capacity in all of the downward, upward and lateral directions, but the increased size makes the ball bearing linear guideway inapplicable to most machines.

The present invention has arisen to mitigate and/or obviate the afore-described disadvantages.

SUMMARY OF THE INVENTION

The primary objective of the present invention is to provide a six-row ball bearing linear guideway with increased load capacity in all of the upward, downward and lateral directions, which is capable of increasing the overall rated static load capacity, and overcoming the problem of the conventional linear ball bearing guideway that two grinding processes must be used in order to increase load capacity in downward direction, and two grinding processes have different grinding datum, which may result in position error between the rolling grooves of the top surface and the lateral surfaces, and reduces the accuracy of the ball bearing guideway. Besides, the size of the ball bearing linear guideway of the present invention is not increased, which enables the linear ball bearing guideway of the present invention to be applicable to most machines.

To achieve the above objective, a six-row ball bearing linear guideway in accordance with the present invention comprises:

a rail being an elongated structure extending along a direction X, two directions perpendicular to the direction X being defined as a direction Y and a direction Z which is perpendicular to the direction Y, a cross section of the rail in the direction X being a symmetrical structure with respect to a symmetrical axis, at both sides of the rail with respect to the symmetrical axis being symmetrically provided three rail rolling grooves;

a slider including an opening via which the slider is allowed to be slidably sleeved onto the rail, the slider being provided with six slider rolling grooves which are aligned with the rail rolling grooves;

a plurality of balls rotatably disposed between the slider rolling grooves and the rail rolling grooves; the linear ball bearing guideway being characterized in that:

the three rail rolling grooves are an upper rail rolling groove, a middle rail rolling groove and a lower rail rolling groove which are formed at both sides of the rail with respect to the symmetrical axis, the upper rail rolling groove is located higher than the middle rail rolling groove in the direction Z, and the middle rail rolling groove is located higher than the lower rail rolling groove in the direction Z; and suppose that a profile factor of the respective rail rolling grooves is C, a radius of curvature of cross section profile of the rail rolling grooves is R, and the balls each have a diameter D, and they satisfy the relation: C=(2R−D)/D, the profile factor of the lower rail rolling grooves is smaller than the profile factor of the upper rail rolling grooves. The profile factor of the lower rail rolling grooves is preferably 0.8 time smaller than the profile factor of the upper rail rolling grooves.

With the six rows of balls disposed between the rail and the slider, the rated static load capacity of the ball bearing linear guideway of the present invention is improved. The six rows of balls are symmetrically disposed at both sides of the head portion of the rail, wherein the balls in the middle and upper rail rolling grooves bear the load in the downward direction, so as to increase the rated static load capacity in the downward direction. The balls in the lower rolling grooves bear the load in the upward direction, and the profile factor of the lower rail rolling grooves is smaller than that of the upper rail rolling grooves, so that the rated static load capacity in the upward direction is also improved. The balls in the upper, middle and lower rail rolling grooves are all able to bear the load capacity in the lateral direction, so that the rated static load capacity in the lateral direction is also improved. Hence, the rated static load capacity of the present invention is improved in all of the upward, downward and lateral directions. Furthermore, the rail rolling grooves are symmetrically disposed at two sides of the rail, so that the rail of the present invention only needs to be subjected to a single grinding process, therefore, manufacturing procedure is simplified and the manufacturing efficiency is improved. Besides, the present invention also solves the problem of the conventional linear ball bearing guideway that the two grinding processes have different grinding datum, which may result in position error between the rolling grooves of the top surface and the lateral surfaces, and reduces the accuracy of the ball bearing guideway. Finally, due to optimum spatial design, the size of the linear ball bearing guideway of the present invention is not increased, which enables the linear ball bearing guideway of the present invention to be applicable to most machines.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 3-8, a six-row ball bearing linear guideway in accordance with a preferred embodiment of the present invention comprises: a rail 30, a slider 40 and a plurality of balls 50.

Figure 3:
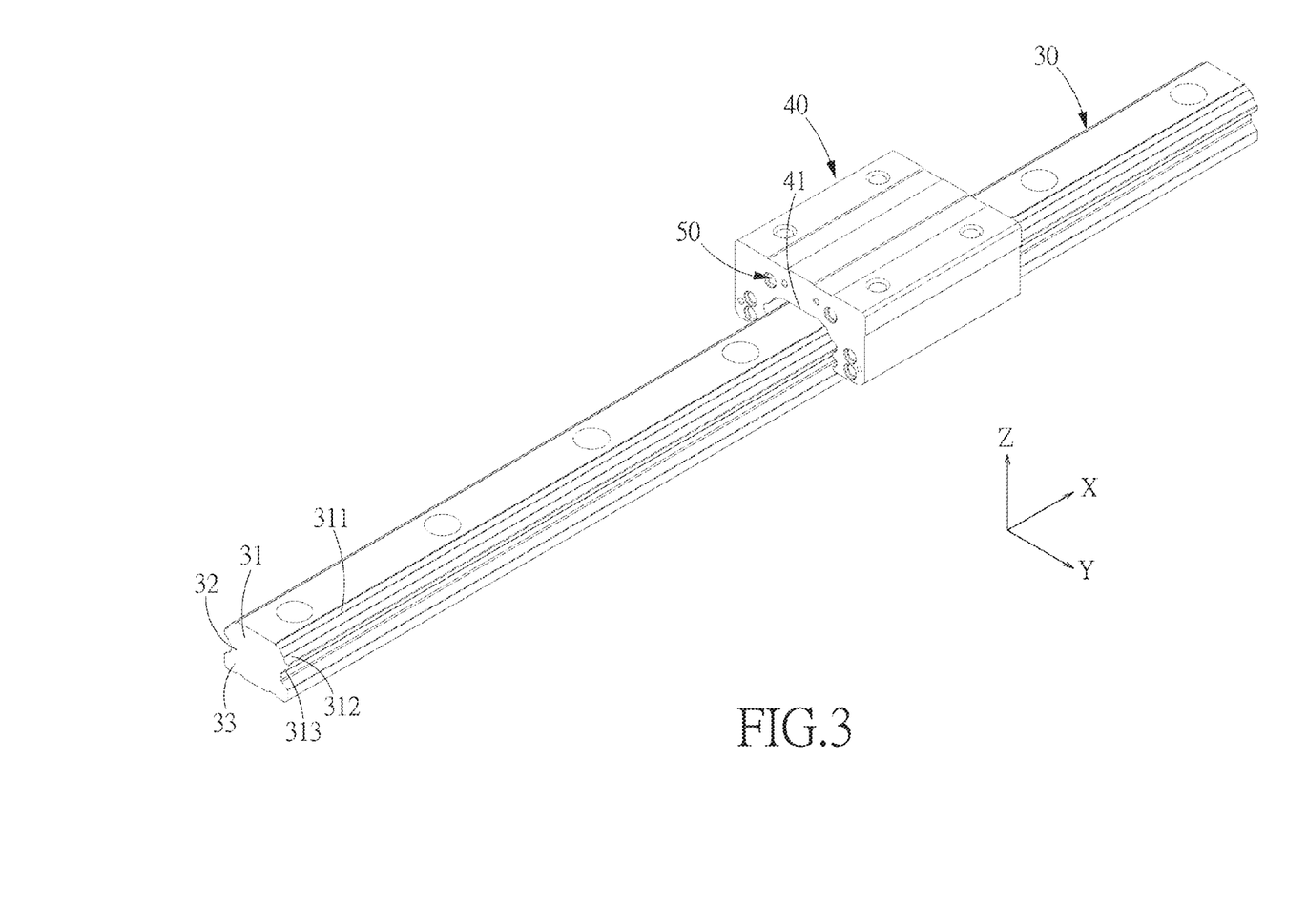
FIG. 3 is a perspective view of a six-row ball bearing linear guideway in accordance with a preferred embodiment of the present invention.
Figure 4:
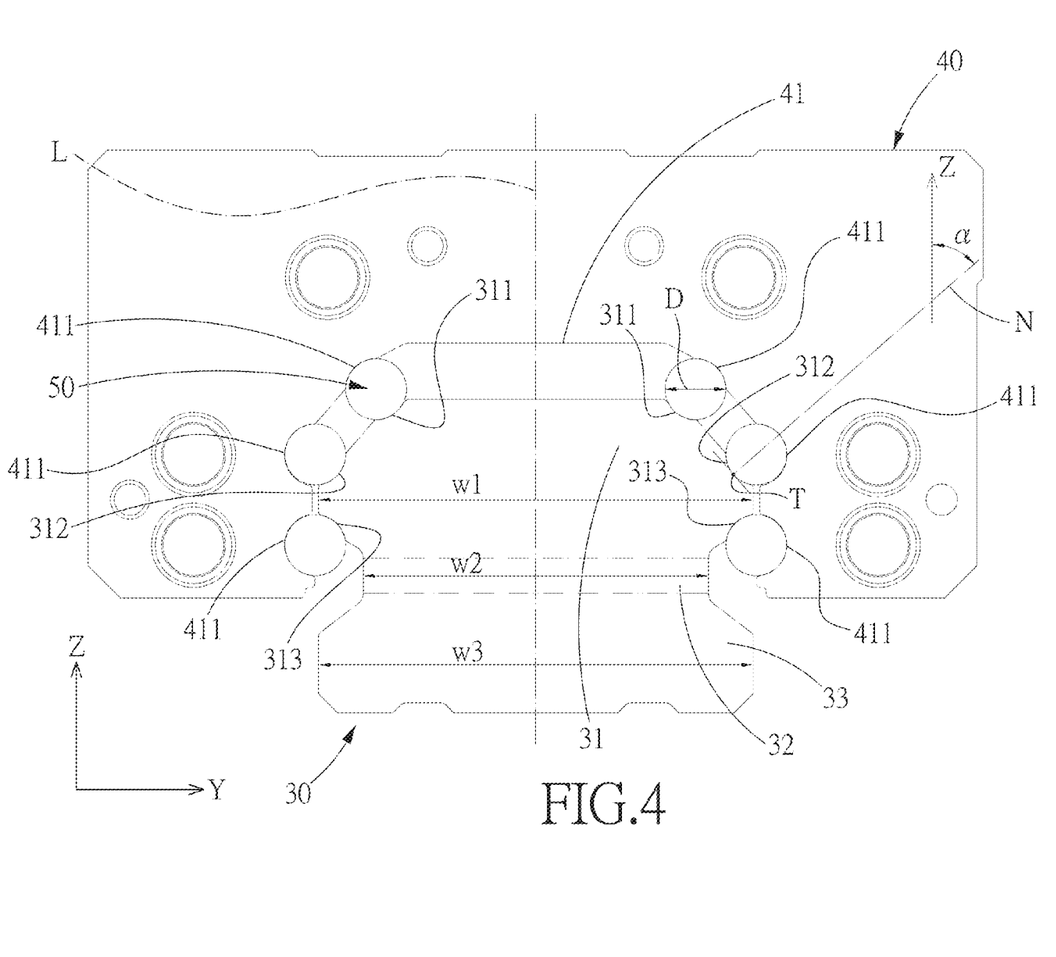
FIG. 4 is an end view of the six-row ball bearing linear guideway in accordance with the present invention.

The rail 30 is an elongated structure extending along a direction X, two directions perpendicular to the direction X are defined as a direction Y and a direction Z which is perpendicular to the direction Y. The cross section of the rail 30 in the direction X is a symmetrical structure with respect to a symmetrical axis L.

The rail 30 includes a head portion 31, a neck portion 32 and a bottom portion 33 which are sequentially arranged in the direction Z. The head portion 31 is located at an upper position than the bottom portion 33 along the direction Z, the direction of the head portion 31 along the direction Z is defined as an upper direction of the direction Z, and the direction of the bottom portion 33 along the direction Z is defined as a lower direction of the direction Z. The head portion 31 has a maximum width in the direction Y defined as a head-portion width W1, the neck portion 32 has a minimum width in the direction Y defined as a neck-portion width W2, the bottom portion 33 has a maximum width in the direction Y defined as a bottom-portion width W3, and W2 is smaller than W1 and W3. At both sides of the rail 30 with respect to the symmetrical axis L are symmetrically provided three rail rolling grooves. In this embodiment, the three rail rolling grooves are an upper rail rolling groove 311, a middle rail rolling groove 312 and a lower rail rolling groove 313 which are formed at both sides of the head portion 31 of the rail 30 with respect to the symmetrical axis L. The upper rail rolling groove 311 is located higher than the middle rail rolling groove 312 in the direction Z, and the middle rail rolling groove 312 is located higher than the lower rail rolling groove 313 in the direction Z. The upper and middle rail rolling grooves 311, 312 are located at the upper half of the head portion 31, and the lower rail rolling groove 313 is located at the lower half of the head portion 31.

The slider 40 includes an opening 41 via which the slider 40 can be slidably sleeved onto the rail 30. The slider 40 is provided with six slider rolling grooves 411 which are aligned with the upper, middle, lower rail rolling grooves 311, 312, 313 of the rail 30.

The balls 50 are rotatably disposed between the slider rolling grooves 411 and the upper, middle and lower rail rolling grooves 311, 312, 313. When the balls 50 are in the upper, middle and lower rail rolling grooves 311, 312, 313, the balls 50 in the two upper rail rolling grooves 311 bear the loads both in the downward and lateral directions, the balls 50 in the two middle rail rolling grooves 312 bear the loads both in the downward and lateral directions, the balls 50 in the two lower rail rolling grooves 313 bear the loads both in the upward and lateral directions. When the balls 50 are received in the upper, middle and lower rail rolling grooves 311, 312, 313, the conditions of the balls 50 and the upper, middle and lower rail rolling grooves 311, 312, 313 satisfy with the assumption of the Hertz contact theory. There is a contact point T between the balls 50 and each of the upper, middle and lower rail rolling grooves 311, 312, 313. On a contact surface of the balls 50 or the contact surface of each of the upper, middle and lower rail rolling grooves 311, 312, 313 is defined a normal line N which passes through the contact point T. Each of the normal lines N of the balls 50 in the upper and middle rail rolling grooves 311, 312 defines a contact angle α of 20-70 degrees with respect to the upper direction of the direction Z. From the viewpoint of manufacturing, if the contact angle α is smaller than 20 degrees, the area of the contact surface of the balls 50 that comes into contact with the upper, middle and lower rail rolling grooves 311, 312, 313 will be reduced, which finally results in reduction in the load capacity of the contact surface. Contrarily, the load capacity of the balls 50 or the upper, middle and lower rail rolling grooves 311, 312, 313 in the direction Z will also be reduced, if the contact angle α is larger than 70 degrees, so the high rigidity in the downward direction of the present invention cannot be achieved. More preferably, the contact angle α is 30-50 degrees, and optimally, 40 degrees, so as to prevent the problems caused by manufacturing stability, and improve the rigidity in the downward direction. Similarly, each of the normal lines N of the balls 50 in the lower rail rolling grooves 313 defines a contact angle α with respect to the lower direction of the direction Z, and the contact angle α of the lower rail rolling grooves 313 with respect to the balls 50 is 20-70 degrees, preferably 30-50 degrees, and optimally, 40 degrees.

Figure 5:
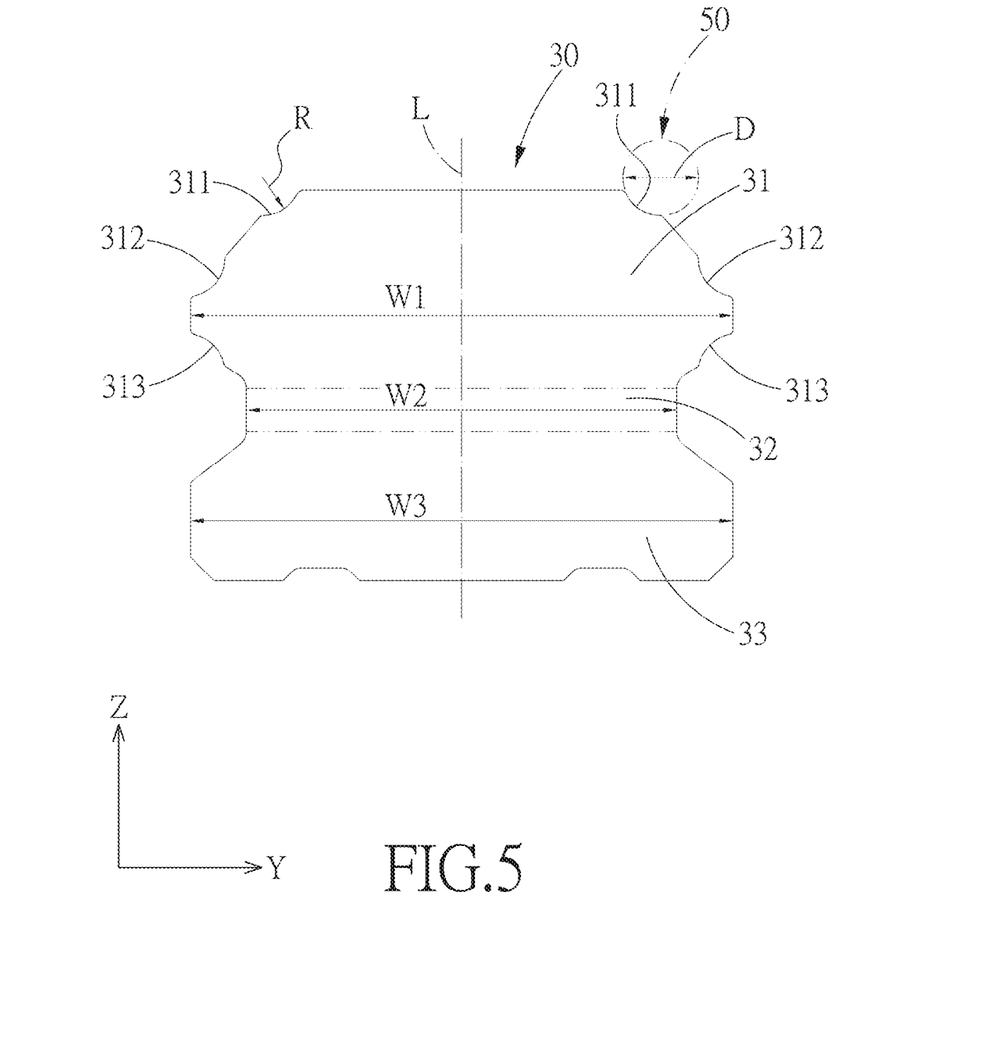
FIG. 5 is a plan view of the six-row ball bearing linear guideway in accordance with the present invention.

What mentioned are the structural relations and features of the ball bearing linear guideway in accordance with the present invention. It is to be noted that the upper, middle and lower rail rolling grooves 311, 312, 313 are arranged at both sides of the rail 30 in a symmetrical manner, and the top surface of the rail 30 is provided with no rolling grooves. Therefore, the rail 30 needs to be subjected to a single lateral grinding process only, which is carried out by two lateral grinding members A at two lateral sides of the rail 30. The present invention does not require the top grinding process or any other grinding process in other directions, therefore, manufacturing procedure is simplified and the manufacturing efficiency is improved. Besides, the present invention also solves the problem of the conventional ball bearing linear guideway that the two grinding processes have different grinding datum, which may result in position error between the rolling grooves of the top surface and the lateral surfaces, and reduces the accuracy of the ball bearing guideway.

Figure 6:
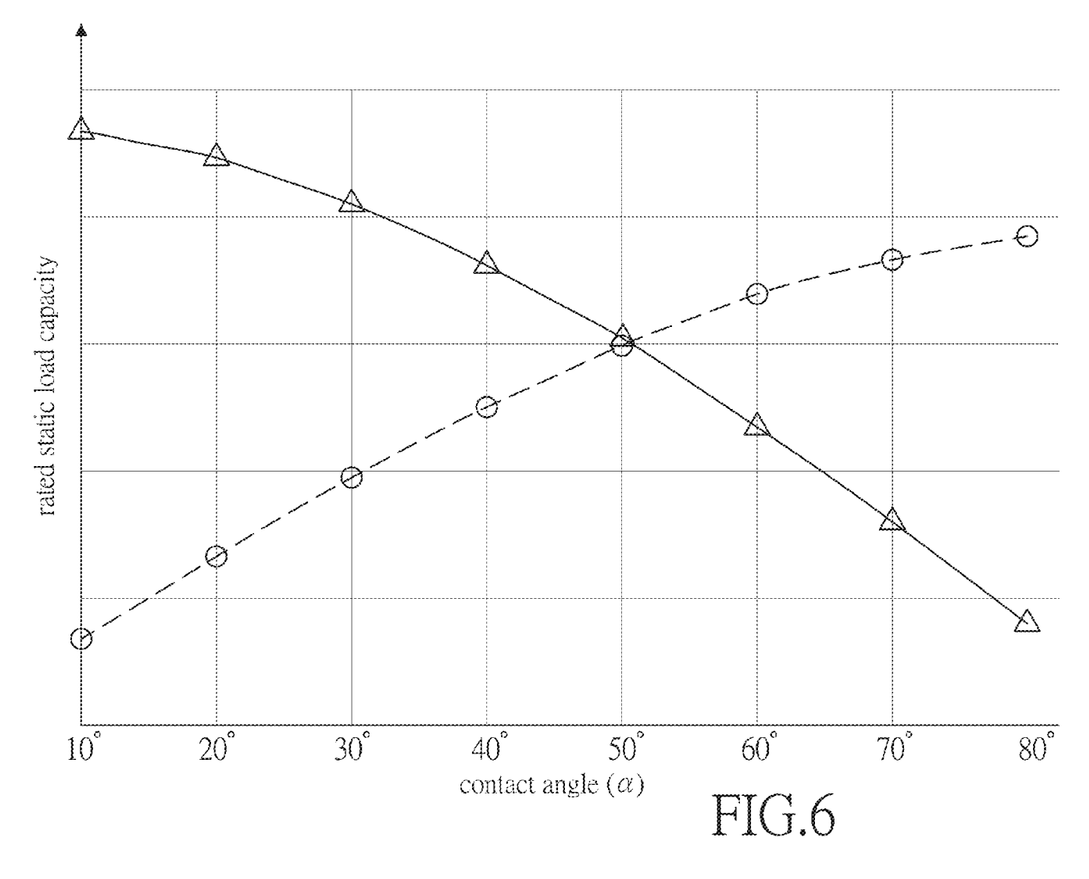
FIG. 6 is a diagram showing the relation between the contact angle of the ball bearing linear guideway of the present invention and the rated static load capacity in the downward and lateral directions.

On the other hand, the contact angle of each of the balls 50 and the upper, middle and lower rail rolling grooves 311, 312, 313 is 20-70 degrees. Please refer to FIG. 6, which is a data diagram showing the relation between the contact angle α and the rated static load capacities in the downward and lateral directions, wherein the vertical axis represents the rated static load capacity of the ball bearing linear guideway, the solid line (the triangle data points) represents the rated static load capacity in the downward direction, and the dotted line (round data points) represents the rated static load capacity in the lateral direction. Reducing the contact angle α can increase the rated static load capacity in the downward direction, but also considerably decreases the rated static load capacity in the lateral direction. FIG. 6 shows that, when the contact angle α is smaller than 20 degrees, the rated static load capacity in the lateral direction continuously declines, while the increase of the rated static load capacity in the downward direction becomes very slow. Similarly, when the contact angle α is larger than 70 degrees, the rated static load capacity in the downward direction continuously declines, while the increase of the rated static load capacity in the lateral direction is not obvious. Namely, when the contact angle α is smaller than 20 degrees or larger than 70 degrees, the rated static load capacity in the desired direction does not increase too much, but the rated static load capacity in another decreases sharply. The ball bearing linear guideway used on a transport means normally has specific requirements on the rated static load capacity both in downward direction and lateral direction, therefore, the contact angle α is preferably between 20-70 degrees. Furthermore, it can be clearly seen from the curves of FIG. 6 that, when the contact angle α is 50 degrees, the rated static load capacity in the downward direction is approximately equal to the rated static load capacity in the lateral direction. Since the present invention is aimed at improving the rated static load capacity in the downward direction, the contact angle α of the present invention is preferably smaller than 50 degrees, so that the rated static load capacity in the downward direction is larger than the rated static load capacity in the lateral direction. From the viewpoint of the rated static load capacity in the lateral direction, when the contact angle is 30 degrees, the rated static load capacity in the lateral direction has reached a level which is more than half the maximum possible load capacity, namely, the rated static load capacity is great enough. When the contact angle α is larger than 30 degrees, the rated static load capacity in the lateral direction can also be maintained, therefore, the contact angle α is preferably larger than 30 degrees. Namely, the contact angle α is preferably 30-50 degrees, and optimally 40 degrees, because when the contact angle α is 40 degrees, the rated static load capacity in the downward direction is obviously higher than the rated static load capacity in the lateral direction, the rated static load capacity in the downward direction is considerably increased, and a relatively good load capacity in the lateral direction is also maintained.

Figure 7:
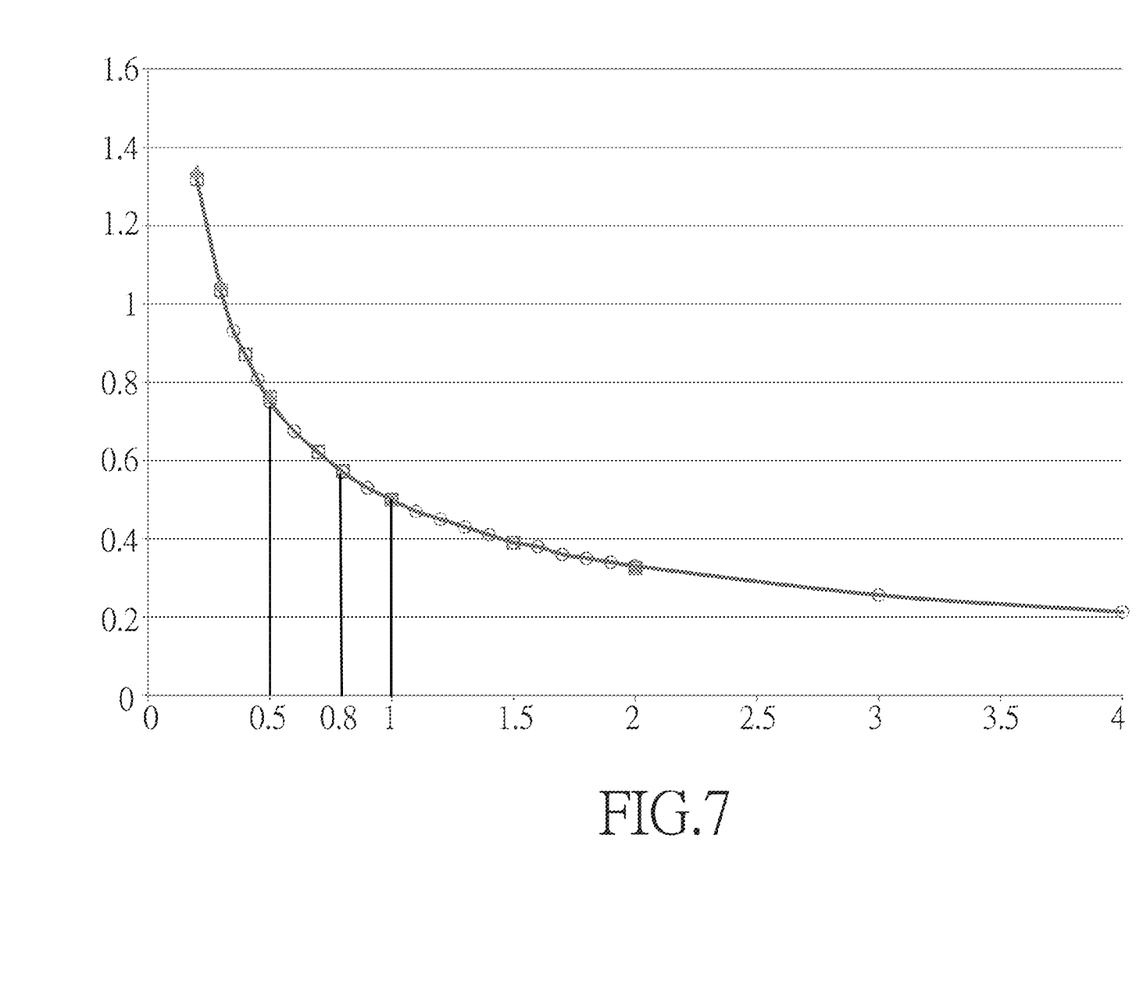
FIG. 7 is a diagram of the ball bearing linear guideway of the present invention, showing the relation between the profile factor and the rated static load capacity in the upward direction.
Figure 8:
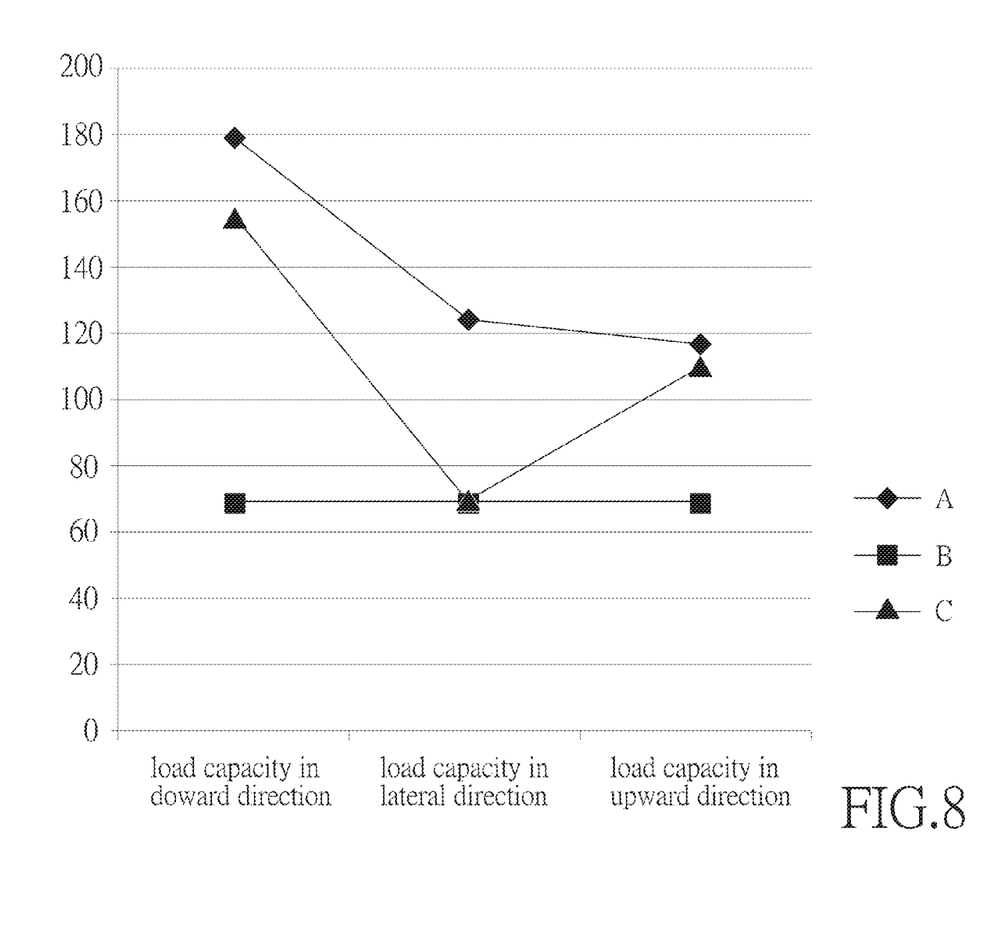
FIG. 8 is a diagram showing that ball bearing linear guideway of the present invention and the conventional linear guideway are compared in terms of the rated static load capacities in upward, downward and lateral directions.

To improve the rated static load capacity in the upward direction, the present invention further defines the contact relations of the respective rolling grooves and the balls with a profile factor C. Suppose that a radius of curvature of cross section profile of the rail rolling grooves is R, and the balls each have a diameter D, and they satisfy the relation: $C=(2R-D)/D$. Please refer to FIG. 7, which is a diagram showing the relation between the profile factor of the lower rail rolling grooves of the six-row ball bearing linear guideway and the rated static load capacity in the upward direction, wherein the horizontal axis represents the proportion of the profile factor of the lower rail rolling grooves to that of the upper rail rolling grooves. The profile factor of the middle rail rolling grooves is set to be equal to the profile factor of the upper rail rolling grooves for the calculation of FIG. 7. However, it is not necessary to set the profile factor of the middle rail rolling grooves to be equal to the profile factor of the upper rail rolling grooves. The profile factor is a dimensionless value and will not be affected by the diameter of the balls, and the vertical axis represents the proportion of the rated static load capacity in the upward direction to the rated static load capacity in the downward direction, and also is dimensionless value. Analysis has been made of the profile factor of various upper rail rolling grooves, wherein X represents a data point at which the profile factor of the upper rail rolling grooves is 0.01, ○ represents a data point at which the profile factor of the upper rail rolling grooves is 0.02, □ represents a data point at which the profile factor of the upper rail rolling grooves is 0.04, Δ represents a data point at which the profile factor of the upper rail rolling grooves is 0.08. FIG. 7 shows that the data points of the profile factors of 0.01-0.08 are located along a curve, and the smaller the proportion of the profile factor of the lower rail rolling grooves to that of the upper rail rolling grooves, the larger the proportion of the rated static load capacity in the upward direction to the rated static load capacity in the downward direction. The curve will become more obviously sharp when the proportion of the profile factors is smaller than 1. Namely, when the profile factor of the lower rail rolling grooves is smaller than that of the upper rolling grooves, the proportion of the rated static load capacity in the upward direction to the rated static load capacity in the downward direction can increase considerably, thus increasing the rated static load capacity in the upward direction (because the rated static load capacity in the downward direction is not changed). Therefore, the profile factor of the lower rail rolling grooves is preferably smaller than that of the upper rail rolling grooves. When the profile factor of the lower rail rolling grooves is 0.8 time smaller than that of the upper rail rolling grooves, the proportion of the rated static load capacity in the upward direction to the rated static load capacity in the downward direction can increase in an accelerated manner, thus making the rated static load capacity of the six-row ball bearing linear guideway of the present invention in the upward direction increase rapidly. Therefore, the profile factor of the lower rail rolling grooves of the six-row ball bearing linear guideway of the present invention is preferably 0.8 time smaller than that of the upper rail rolling grooves. It can be seen from FIG. 7 that, when the profile factor of the lower rail rolling grooves is 0.5 time smaller than the profile factor of the upper rail rolling grooves, the proportion of the rated static load capacity in the upward direction to the rated static load capacity in the downward direction will increase rapidly. When the profile factor of the lower rail rolling grooves is 0.5 time the profile factor of the upper rail rolling grooves, the proportion of the rated static load capacity in the upward direction to the rated static load capacity in the downward direction will almost be 0.8, namely, the rated static load capacity in the upward direction can be increased to 0.8 time the rated static load capacity in the downward direction. When the profile factor of the lower rail rolling grooves is 0.4 time the profile factor of the upper rail rolling grooves, the proportion of the rated static load capacity in the upward direction to the rated static load capacity in the downward direction will be large than 1, namely, the rated static load capacity in the upward direction is larger than the rated static load capacity in the downward direction. At this moment, the six-row ball bearing linear guideway of the present invention provides optimal rated static load capacity not only in the downward direction but also in the upward direction. The profile factor of the lower rail rolling grooves is preferably 0.5 time the profile factor of the upper rail rolling grooves, and the profile factor of the upper rail rolling grooves is optimally 0.02-0.04 when taking into account of the manufacturing difficulty and the rated static load capacity in the downward direction.

To prove that the rated static load capacity of the six-row ball bearing linear guideway in accordance with the present invention is improved in the downward, upward and lateral directions, we made a comparison between the six-row ball bearing linear guideway of the present invention and the conventional linear guideway, wherein the linear guideways have equal width of 34 mm, the profile factor of the upper and middle rail rolling grooves are 0.02, the profile factor of the lower rail rolling grooves is 0.6 time smaller than the profile factor of the upper rail rolling grooves, and the contact angle $\alpha$ is 40. The ball bearing linear guideway of the present invention and the conventional linear guideway are compared in terms of the rated static load capacities in upward, downward and lateral directions, and load capacity unit is kN. Data A represents the present invention, data B represents an ordinary ball bearing linear guide way of the same size as the present invention, and data C represents a conventional ball bearing linear guideway with improved load capacity in the downward direction. It is obvious from FIG. 8 that the rated static load capacities of the ball bearing linear guideway of the present invention in downward, upward, and lateral directions are way higher than the ordinary conventional linear ball bearing guideway, and is also obviously higher than the conventional linear ball bearing guideway with improved load capacity in the downward direction (under the condition that the ball bearing linear guideways compared are the same size). More particularly, the rated static load capacity of the present invention in the lateral direction is way bigger than that of the conventional linear ball bearing guideway with improved load capacity in the downward direction.

With the six rows of balls disposed between the rail and the slider, the rated static load capacity of the ball bearing linear guideway of the present invention is improved. The six rows of balls are symmetrically disposed at both sides of the head portion of the rail, wherein the balls in the middle and upper rail rolling grooves bear the load in the downward direction, so as to increase the rated static load capacity in the downward direction. The balls in the lower rail rolling grooves bear the load in the upward direction, and the profile factor of the lower rail rolling grooves is smaller than that of the upper rail rolling grooves, so that the rated static load capacity in the upward direction is also improved. The balls in the upper, middle and lower rail rolling grooves are all able to bear the load capacity in the lateral direction, so that the rated static load capacity in the lateral direction is also improved. Hence, the rated static load capacity of the present invention is improved in all of the upward, downward and lateral directions.

While we have shown and described various embodiments in accordance with the present invention, it is clear to those skilled in the art that further embodiments may be made without departing from the scope of the present invention.

What is claimed is:

1. A six-row ball bearing linear guideway comprising:
a rail being an elongated structure extending along a direction X, two directions perpendicular to the direction X being defined as a direction Y and a direction Z which is perpendicular to the direction Y, a cross section of the rail in the direction X being a symmetrical structure with respect to a symmetrical axis, at both sides of the rail with respect to the symmetrical axis being symmetrically provided three rail rolling grooves;
a slider including an opening via which the slider is allowed to be slidably sleeved onto the rail, the slider being provided with six slider rolling grooves which are aligned with the rail rolling grooves;
a plurality of balls rotatably disposed between the slider rolling grooves and the rail rolling grooves; the linear ball bearing guideway being characterized in that:
the three rail rolling grooves are an upper rail rolling groove, a middle rail rolling groove and a lower rail rolling groove which are formed at both sides of the rail with respect to the symmetrical axis, the upper rail rolling groove is located higher than the middle rail rolling groove in the direction Z, and the middle rail rolling groove is located higher than the lower rail rolling groove in the direction Z; and
suppose that a profile factor of the respective rail rolling grooves is C, a radius of curvature of cross section profile of the rail rolling grooves is R, and the balls each have a diameter D, and they satisfy the relation: $C=(2R-D)/D$, the profile factor of the lower rail rolling grooves is smaller than the profile factor of the upper rail rolling grooves.

2. The six-row ball bearing linear guideway as claimed in claim 1, wherein the profile factor of the lower rail rolling grooves is 0.8 time smaller than the profile factor of the upper rail rolling grooves.

3. The six-row ball bearing linear guideway as claimed in claim 2, wherein the profile factor of the lower rail rolling grooves is 0.5 time smaller than the profile factor of the upper rail rolling grooves.

4. The six-row ball bearing linear guideway as claimed in claim 1, wherein the profile factor of the middle rail rolling grooves is equal to the profile factor of the upper rail rolling grooves.

5. The six-row ball bearing linear guideway as claimed in claim 1, wherein the rail includes a head portion, a neck portion and a bottom portion which are sequentially arranged in the direction Z, the head portion is located at an upper position than the bottom portion along the direction Z, the direction of the head portion along the direction Z is defined as an upper direction of the direction Z, and the direction of the bottom portion along the direction Z is defined as a lower direction of the direction Z, there is a contact point between the balls and each of the upper, middle and lower rail rolling grooves, and each of the concoct points is provided with a normal line, each of the normal lines of the upper and middle rail rolling grooves defines a contact angle of 20-70 degrees with respect to the upper direction of the direction Z, each of the normal lines of the lower rail rolling grooves defines a contact angle of 20-70 degrees with respect to the lower direction of the direction Z.

6. The six-row ball bearing linear guideway as claimed in claim 5, wherein the contact angle of each of the normal lines of the upper and middle rail rolling grooves is 30-50 degrees, and the contact angle of each of the normal lines of the lower rail rolling grooves is 30-50 degrees.

7. The six-row ball bearing linear guideway as claimed in claim 6, wherein the contact angle of each of the normal lines of the upper and middle rail rolling grooves is 40 degrees, and the contact angle of each of the normal lines in the lower rail rolling grooves is 40 degrees.

8. The six-row ball bearing linear guideway as claimed in claim 1, wherein the profile factor of the upper rail rolling grooves is 0.01-0.08.

9. The six-row ball bearing linear guideway as claimed in claim 8, wherein the profile factor of the upper rail rolling grooves is 0.02-0.04.

10. The six-row ball bearing linear guideway as claimed in claim 1, wherein the rail including a head portion, a neck portion and a bottom portion which are sequentially arranged in the direction Z, the head portion being located at an upper position than the bottom portion along the direction Z, a direction of the head portion along the direction Z being defined as an upper direction of the direction Z, and a direction of the bottom portion along the direction Z being defined as a lower direction of the direction Z, the upper and middle rail rolling grooves are located at the upper half of the head portion, and the lower rail rolling groove is located at the lower half of the head portion.

* * * * *